June 1, 1937. K. R. SHAW 2,082,744
RUBBER THREAD AND METHOD OF MAKING SAME
Filed July 13, 1935 3 Sheets-Sheet 1

INVENTOR.
Kenneth R. Shaw,
BY
ATTORNEY.

INVENTOR
Kenneth R. Shaw,
BY
ATTORNEY.

Patented June 1, 1937

2,082,744

UNITED STATES PATENT OFFICE 2,082,744

RUBBER THREAD AND METHOD OF MAKING SAME

Kenneth R. Shaw, Easthampton, Mass., assignor to Easthampton Rubber Thread Co., Easthampton, Mass., a corporation of Massachusetts Application July 13, 1935, Serial No. 31,219

12 Claims. (Cl. 18—54)

This invention relates to the manufacture of rubber thread. It has for its general object to effect economies in this process and to facilitate the handling of the thread both during the process of manufacture and also in subsequent operations, such as covering, and in the braiding, knitting, weaving and similar operations in which the thread may be used. The invention is a continuation, in part, of my pending application Serial No. 6865, filed February 16, 1935, for Methods of and machines for producing rubber thread.

The rubber thread of commerce is manufactured by two methods, one consisting in extruding or otherwise depositing a thread-like body of rubber latex and causing this body to harden into a filamentary form, while the other consists in cutting a thread from a sheet of calendered rubber. The threads produced by these two methods have different characteristics, one being better for some purposes and the other superior for other uses. The practice almost universally followed commercially in this country in making rubber thread from calendered rubber consists in winding a sheet of rubber on a large drum and then cutting simultaneously through all of the plies or convolutions on the drum by means of a sharp edged rotary knife or cutter of the disk type, the cutter being fed axially of the drum at a predetermined but fixed rate simultaneously with the rotation of the drum at a fixed speed.

A serious objection to this method is the fact that no practical way has been devised heretofore for guiding the individual threads away from the cutting point without having them become entangled with adjacent threads. Consequently, after the cutting operation has been completed, it is necessary to untangle the entire mass of cut threads. This operation must be performed by hand and the expense involved in it is usually the greatest single item of cost in the production of the thread. After the threads have been untangled they are then skeined or put up in any suitable form for use in subsequent operations.

A further objection to this method is that the length of each thread cut from a single sheet depends upon the length of that sheet and this factor, in turn, is limited by the thickness of rubber that it is feasible to cut in a single operation. It is impossible, however, to produce thread by this method of the long lengths often desired in weaving, braiding, and similar operations.

Furthermore, in this prior method considerable scrap necessarily is produced, and because of the fact that the rubber must be vulcanized before being cut, the value of this scrap stock is relatively small. In connection with various fabricating processes in which rubber thread is utilized, it is important to maintain a substantialy uniform tension on all of the rubber threads going into the product. For example, in weaving elastic fabrics, if there is any substantial difference in the tension on the different threads incorporated in the same web, these differences will tend to produce irregularities in the goods and prevent the woven web from lying flat and smooth. The attainment of this object requires much care, skill and judgment on the part of the workmen, and, in addition, it involves considerable experimenting and adjusting before exactly the right condition is obtained.

The present invention is especially concerned with the considerations above described, and it aims to devise a thoroughly practical solution for the problems presented by them. While the invention is directed primarily to improvements in the manufacture of rubber thread, it also involves an improved form of rubber thread product and a novel rubber thread package.

The nature of the invention will be readily understood from the following description when read in connection with the accompanying drawings, and the novel features will be particularly pointed out in the appended claims.

Figure 1:
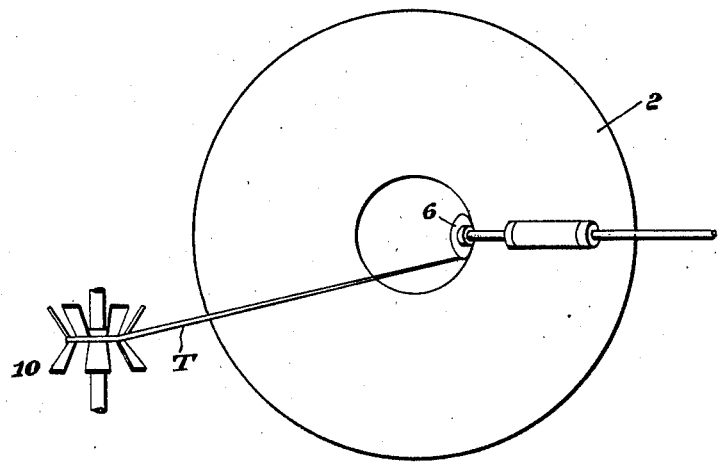
Figure 1 is a plan view illustrating diagrammatically steps in the process of manufacture of cut rubber thread in accordance with this invention.

The preferred method of manufacturing cut rubber thread in accordance with this invention comprises the steps of assembling a series of circular sheets of rubber in superposed relationship and in a flat condition, adhesively securing these sheets temporarily to each other, and then revolving this assembly edgewise against the sharpened edge of a rapidly revolving knife while relatively feeding the knife and the assembly in such a manner as to cut a continuous tape from the stack of sheets. This tape is composed of rubber threads lying parallel to each other and adhesively secured together, the nature of the union between adjoining threads being such that while it maintains the tape-like form of the structure during normal handling, it can readily be broken to separate the individual threads from each other. Such a tape is taken away from the cutting point continuously as the cutting operation progresses, is wound on a suitable support or packaged in any other manner to facilitate such handling, and is divided into its component threads at any time appropriate to the requirements of individual uses. While the rubber sheets can be assembled in the manner just described while in an unvulcanized condition, and the thread may be cut with the rubber in this condition and subsequently vulcanized, it is usually preferable to vulcanize the sheets prior to performing the cutting operation. The customary procedure is to assemble unvulcanized sheets, either cut to size or not, as desired, and to secure them together in superposed relationship by a controlled adhesion so that the threads will be suitably united in the tape produced as above described. This may conveniently be done by dusting the sheets with talc, most of which is rubbed off, so that the plies will not adhere firmly to each other but will be joined lightly together. This assembling operation may be performed by winding an unvulcanized sheet of rubber of suitable thickness upon a drum or any other convenient support until an assembly of the desired thickness has been built up, the sheet being dusted with talc during the winding operation. At the completion of this step the rubber body may be cut from the roll, flattened out on a table, and the entire assembly cut into an annular form as indicated at 2 in Figs. 1 and 2. The scrap rubber resulting from this cutting or trimming operation is returned to the calender for re-working. This annular assembly of sheets, which in a typical case may have a thickness of from one-half an inch to an inch, next is placed in suitable forms to confine it both laterally and radially and is vulcanized. After being cured the assembly is placed on a turn table, such as that shown at 3 in Fig. 2, this turn table being covered with a soft unvulcanized layer 4 of rubber and the stack 2 of rubber plies being secured by shellac or some other suitable adhesive to the surface of this layer 4. The assembly is now ready for the cutting operation.

A machine designed for this purpose is illustrated in my pending application above referred to. It comprises a disk cutter 6 mounted on an inclined shaft 7 and revolved at a high speed while the turn table is rotated at a very much lower speed. Preferably the cutting operation starts at the inner circumference of the annulus and proceeds outwardly toward the periphery of the stack, the knife being fed radially outward a fixed distance, depending upon the size of the rubber being cut, during each revolution of the turn table.

In order to make the cutter 6 operate properly, its axis should be so inclined as to intersect the upper surface of the turn table at substantially the axis of the latter. This would theoretically call for a constant variation in the angular position of the shaft 7 as the cutting operation progresses, but an intermediate or average setting may be made which will give entirely satisfactory results, the knife being held continuously at one angle.

Figure 10:
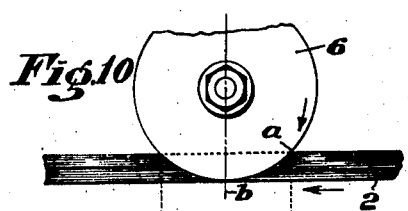
Figs. 10 and 11 are diagrammatic views illustrating the reason for the inclination of the cutting knife or disk as shown in Figs. 1 and 2.
Figure 11:
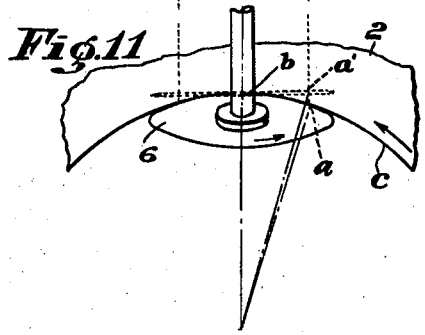

The reason for this angular setting will be readily understood from an inspection of Figs. 10 and 11, the former showing a face view of the cutter and the latter a plan view. Assuming the cutter and the work to revolve in respective directions indicated by the arrows, it will be evident that the point $a$, Fig. 10, at which the cutting operation starts on the uppermost ply, is considerably in advance of the point $b$ at which the bottommost ply is cut. It will also be seen from the plan view of Fig. 11 that if the cutter 6 were located at right angles to the plane of the turn table (as would be the case if its shaft were parallel to said plane) then the point $a'$ (corresponding to the point $a$ of Fig. 10), would lie considerably farther from the axis of rotation of the turn table than the point $b$. Consequently, the plane of cut will not be at right angles to the surfaces of the plies, and a square thread, therefore, will not be produced. Also, such an arrangement will necessarily cause an excessive rubbing action of the cut surfaces of the backing layer 4 against the flat surface of the knife and will tend both to turn the cutting edge and also to seriously mutilate the backing layer. These difficulties are overcome by tipping the knife forward, as shown in Fig. 11, far enough to bring the point $a$ into line with the inner circumference $c$ of the assembly 2. In other words, the radius of this point $a$ then is substantially equal to that of the point $b$ and to those of the other points on the edge of the cutter between the points $a$ and $b$. In other words, the entire portion of the cutting edge then lies substantially in the circumference $c$. Of course this is strictly true for a given circumference only, but the greatest difficulty occurs with a small internal radius. As the radius on which the cutter works increases, the difficulty due to clearance decreases and the only effect produced by the change is that on large radii the inner wall of the stock of plies becomes slightly slanted. However, the cutter works freely and the operating conditions maintained are entirely satisfactory. It should be understood that an ample supply of water is constantly fed on the cutter during operation. Also, that since the knife cuts slightly into the upper surface of the layer 4, a clean cut is made on the lowermost ply as well as on all the other plies.

Figure 12:
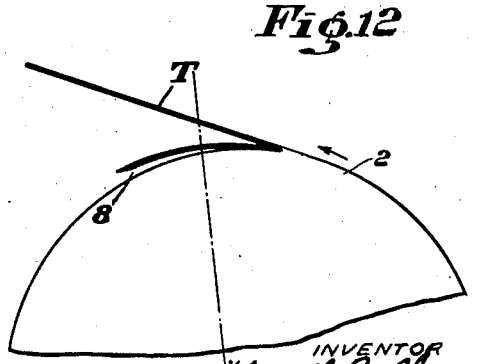
Fig. 12 is a diagrammatic view of a modification of the arrangement illustrated in Figs. 1 and 2.

This problem of cutting a stack of rubber plies simultaneously to produce a tape, can also be performed with the aid of a concave cutter or rotary knife of a dished form as shown at 8, Fig. 12. Here the cutting operation proceeds from the outer circumference inwardly, the dished or concave form of the cutter providing the necessary clearance for the uncut stock. With this arrangement, also, the knife should be tipped at approximately the same angle as the flat knife in order to produce thread of square cross-sectional form. This dished knife is, however, somewhat more difficult to make and to keep in proper condition than is the knife 6, and accordingly, the latter is ordinarily preferred.

Figure 2:
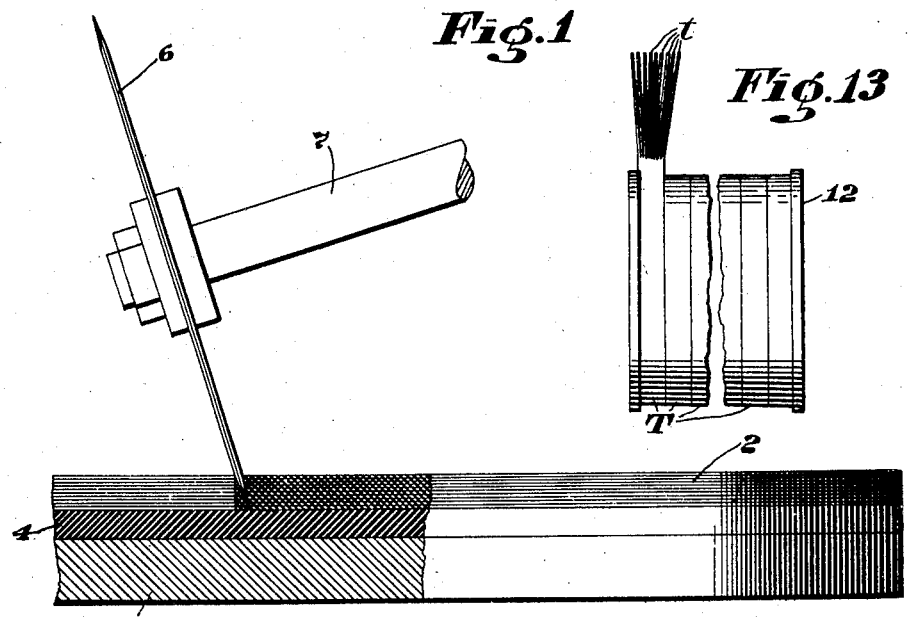
Fig. 2 is a side view, partly in cross-section, of certain of the parts illustrated in Fig. 1.

The tape T produced in the manner above described can be guided continuously away from the cutting point by means of suitable rolls, one of which is shown at 10 in Fig. 1, and wound on a beam, coiled in delivery cans, or simply fed into a box or other container. Either on its way to this packaging operation, or at a later time, as desired, the tape is dried. For most purposes it is shipped directly to the weavers, knitters, braiders, or others who are to use the thread in fabricating operations while it is still in a tape form. Thus the labor involved in untangling the great mass of thread produced in the prior thread cutting operations is completely eliminated.

Figure 13:
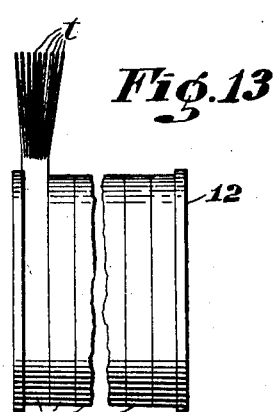
Fig. 13 is a rear view, with parts broken away, of the roll or beam shown in Fig. 5.
Figure 4:
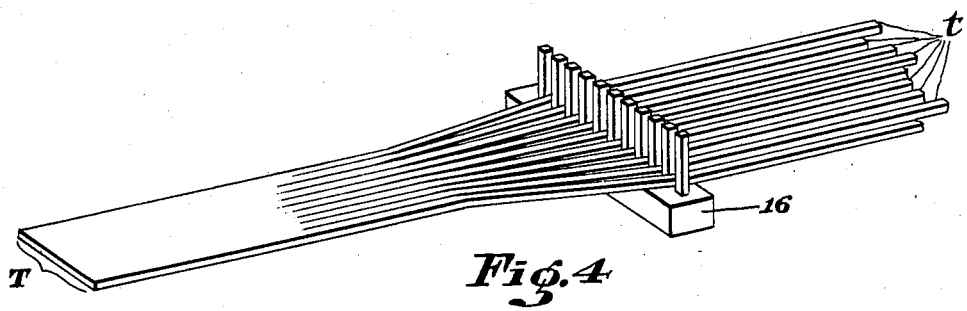
Fig. 4 is a similar view illustrating an additional step in the process.
Figure 5:
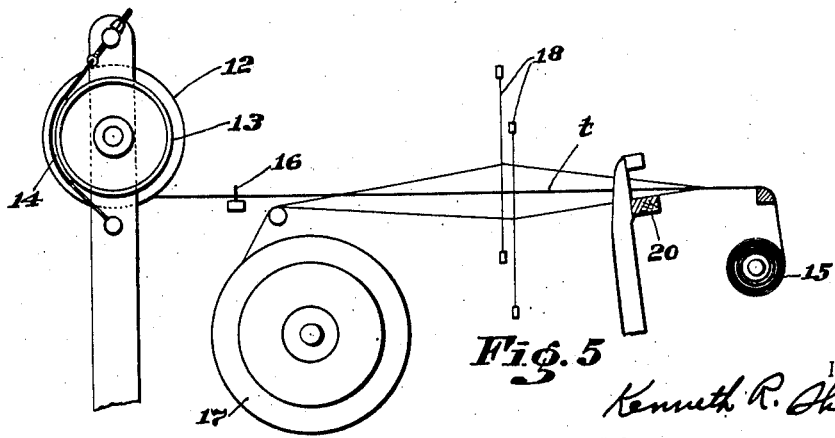
Fig. 5 is a diagrammatic view showing the manner in which the product produced by this invention may be handled in a loom.

The tape may be split or divided into its component threads at any desired point. When the thread is to be used in weaving, braiding, or the like, it is preferable to supply it to the fabricating machine while in its assembled and tape-like form, and then to separate the threads. For this purpose the tape may be wound on a roll or beam 12, Figs. 5 and 13, and in order to place it under the desired tension required in the fabricating operation, the beam is equipped with a brake drum 13 with which a friction brake band or shoe 13 is associated, a suitable adjustment being provided to vary the drag or tension so applied. From this beam the individual threads t, Figs. 4 and 5, are led over the breast beam of the loom and to the takeup roll 15. On their way through the machine the threads are guided between the teeth of a comb 16. They are necessarily maintained under strong tension and greatly elongated during the weaving operation, and this tension, combined with the action of the comb, readily breaks the bonds joining the threads to each other and divides the tape into its component threads entirely incidental to the normal operation of the loom. In Fig. 5 the warp beam is indicated at 17, the warp harnesses at 18, and the lay at 20. The rubber harnesses are not shown. An important advantage in supplying the thread to the loom or to a braider in this manner is that it is much easier to maintain a uniform tension on all of the threads incorporated in the woven web than otherwise would be possible.

Figure 14:
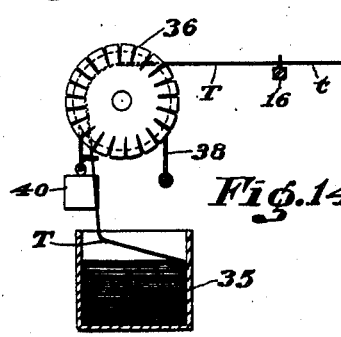
Fig. 14 is a diagrammatic view of another arrangement for supplying rubber thread to a loom or other fabricating machine.

Another method of supplying rubber thread to such machines as those above mentioned and simultaneously tensioning the rubber threads is illustrated in Fig. 14. The tape T is brought to the machine loosely disposed in a box or can 35, is led over a feed wheel 36 of a type much used in the rubber industry, and thence through the comb 16 to the weaving, braiding, or other fabricating instrumentalities. Secured fast on the shaft of the feed wheel 36 is a drum 37 over which a brake band 38 runs, one end of the brake band being secured in a fixed position and the opposite end having a weight 40 fastened to it to apply the necessary drag or resistance to the rotation of the feed wheel. This wheel has two sets of diverging fingers between which the tape is caught and held, these fingers cooperating, in effect, to form a labyrinth which prevents any slip of the tape relatively to the wheel. Consequently, this arrangement provides a very convenient method of tensioning the entire series of threads, and since they are all bonded temporarily to each other and are all tensioned by the same mechanism, a uniform tension is readily produced and maintained. The difficulties heretofore encountered in holding a series of independent rubber threads under the same degree of tension thus is effectually overcome.

In preparing the thread for some other uses it is necessary to divide the tape into its individual threads and to spool the threads, coil them in boxes, wind them on cops or cores of some other type, or to make thread packages suited to the requirements of particular operations. These steps are easily performed by unwinding the tape from the original package made in connection with the cutting operation, placing it under tension, and either running it through a comb, or in any other way pulling the threads apart. The separation of them is easily effected by placing them under differential tension, either with or without some small degree of lateral pulling action, and they may be run in this condition to the point where they are to be acted upon. In covering individual rubber thread it is usually preferable to adopt the practice illustrated in Fig. 5 and to feed the individual threads to the different covering spindles or heads. In all of these operations a substantial saving is effected in handling between the cutting point and the operation in which the thread is finally used.

The foregoing method is not dependent upon any particular process for making the sheet rubber, this material being produced either directly from rubber latex by known methods or the usual milling operation. Also, as above indicated, the cutting operation can be performed while the plies or sheets are in an unvulcanized condition and the vulcanizing operation may later be performed on the tape or the threads by immersing in hot water, or in any other convenient manner. For obvious reasons, however, the method above described is preferred at the present state of the development of the art.

Figure 3:
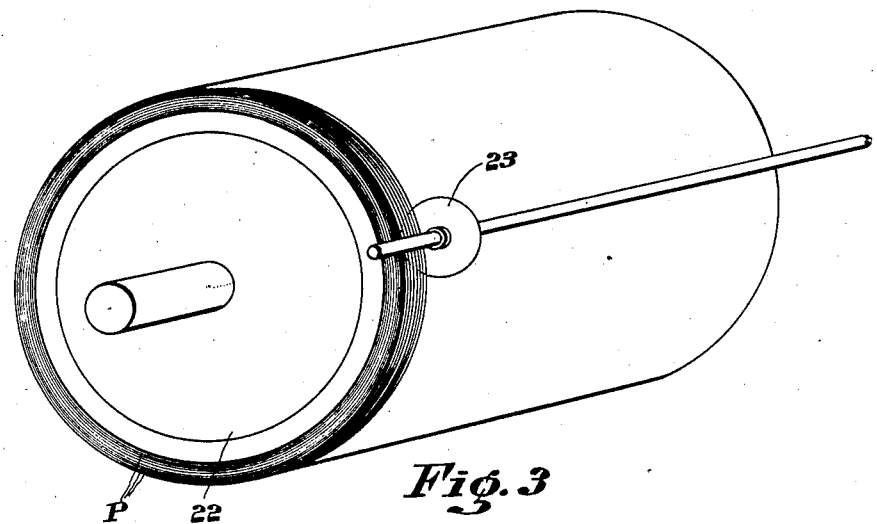
Fig. 3 is a perspective view showing an alternative method of making cut rubber thread.

It is also entirely feasible to produce a tape such as that described in machines similar to those heretofore used in manufacturing cut rubber thread by winding superposed cylinders or tubes of sheet rubber on a cutting drum 22, Fig. 3, of the common form, and then cutting the assembly. It should be understood that each ply P in the layer of rubber shown in the drum 22 is a complete cylinder as distinguished from the structure produced by winding a sheet continuously upon itself on the periphery of the drum. By cutting through this entire thickness of rubber plies with a rotary disk cutter 23 driven at a high speed and fed axially of the drum at a uniform rate while the drum revolves at a fixed speed, and assuming the plies P to be temporarily united to each other in the same manner as are the plies of the stack 2, then a tape would be produced composed of individual threads adhesively joined to each other, one thread being cut from each ply. The tape so formed can then be treated in the same manner as the tape T above described.

By either of these methods much longer lengths of thread can be cut than by the commercial process heretofore employed universally.

Figure 6:
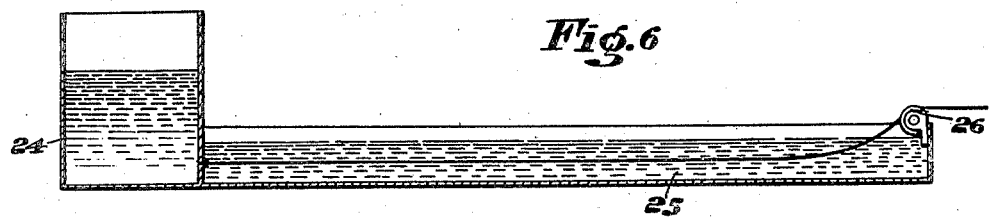
Figs. 6 and 7 are side and plan views, respectively, largely diagrammatic in character, showing a method of making thread embodying features of this invention from rubber latex.
Figure 7:
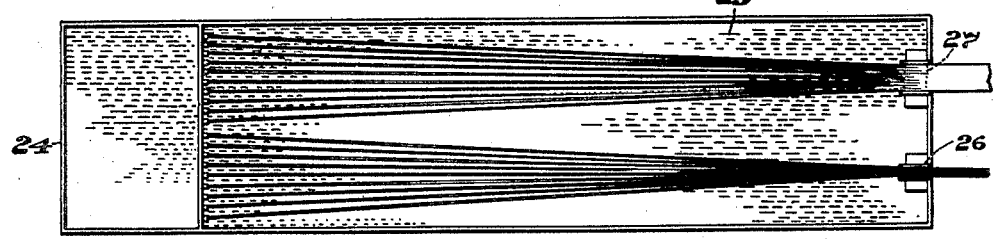

The advantage of handling a series of threads while maintaining them temporarily in an assembled condition may also be obtained when the threads are made from rubber latex. Figs. 6 and 7 illustrate diagrammatically one process of making thread in this manner. In these figures a latex tank is shown at 24, this tank having near its bottom a series of small orifices through which the latex is forced into a hardening bath 25. The individual threads are drawn from this bath, either over a grooved roll 26 or over a spool-like roll 27. By bringing these threads into lateral contact with each other in the desired arrangement and when they have reached the proper condition of dryness, they can be made to adhere to each other with that degree of firmness required for the purposes of this invention, the adhesive union between adjoining threads still being sufficiently weak to permit the easy separation of them when necessary. The groups of threads produced in this manner may be arranged in the form of a flat tape, a somewhat rounded or rope-like shape, or they may be given any other form suited to the use ultimately to be made of them or to the processes through which they are to pass. Talc may be blown between the threads immediately before they are brought together so as to afford additional control of the degree of adhesion between them.

Figure 8:
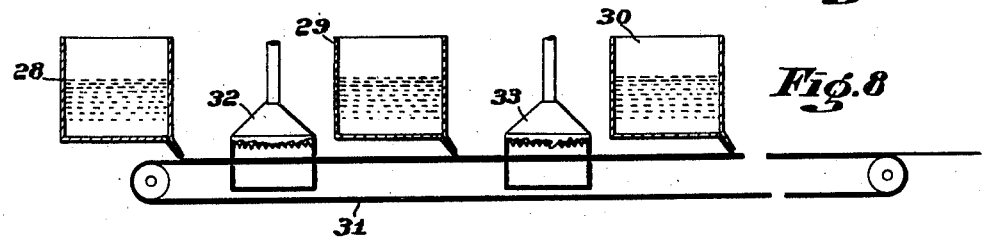
Figs. 8 and 9 are views similar to Figs. 6 and 7 showing another method of making thread from latex.
Figure 9:
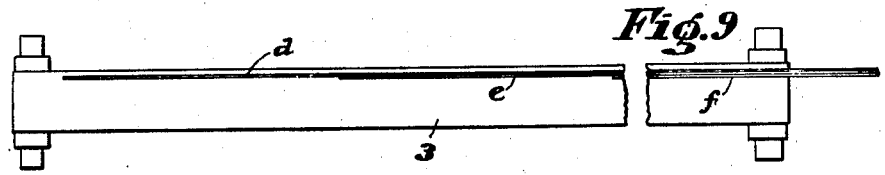

Another method of manufacturing rubber thread from latex, modified in accordance with the present invention, is illustrated in Figs. 8 and 9. Here a series of latex tanks, in this particular instance three, indicated, respectively, at 28, 29 and 30, are arranged to deliver controlled streams of latex upon a continuously travelling belt 31. The first stream of latex so applied is carried forward by the belt through a heating chamber 32 where it is dried and hardened. The second stream of latex is then delivered immediately beside the hardened filament or thread and passes through the second heating chamber 33. These operations are repeated until the desired number of threads have been formed. All of these threads are in adhesive contact with each other and the degree of adhesion may be controlled by dusting them lightly with talc immediately following the hardening of the respective threads. Thus a tape is formed essentially like that above described. It is removed from the belt at the end of the upper run and thereafter is handled in the same manner as the cut tape.

In all of the foregoing methods, the advantage is realized of maintaining the threads going to a certain operation in the form of a tape in which the individual threads are united with sufficient firmness to maintain the integrity of the assembly during normal handling, while still permitting the convenient separation of the threads at the desired point in the process. In addition, the invention effects a very substantial economy in the manufacture of cut rubber thread since the production of the threads in a tape-like form, as above described, eliminates almost entirely the labor heretofore involved in untangling the threads after the cutting operation. As previously stated, this has been the largest single item of expense in the production of cut rubber threads.

Having thus described my invention, what I desire to claim as new is:

1. That improvement in methods of making rubber thread which consists in assembling a series of sheets of rubber in superposed relationship, producing a controlled adhesion between said sheets, cutting simultaneously through said sheets while relatively feeding the cutting implement and said assembly to produce a tape composed of threads cut from said respective sheets, the adhesion between said sheets being so controlled that the threads in said tape will normally be held together but being such that the threads can readily be pulled apart when desired.

2. That improvement in methods of making rubber thread which consists in assembling a plurality of annular sheets of rubber in superposed relationship to form a stack, bonding said sheets temporarily together, revolving said stack edgewise against the edge of a rotating cutter while relatively feeding the cutter and said stack to cause the cutter to cut along the inner circumferences of said sheets and thereby to cut continuous threads of rubber from said respective sheets with said threads bonded together in the form of a tape, and holding said sheets on a flat support during said cutting and feeding operations.

3. An article of the character described, comprising a flat, wide tape composed of a series of rubber threads bonded directly to each other solely by the inherent adhesiveness of the rubber in parallel, side by side relationship, said tape being of uniform thickness and said thickness being equal to that of an individual thread, and the bond between adjacent threads being sufficiently strong to maintain the integrity of the tape during normal handling but being readily breakable to permit the separation of the threads when desired.

4. An article of the character described, comprising a tape composed of a series of rubber threads lightly vulcanized together in parallel, side by side relationship, each of said threads being of approximately rectangular form in cross-section and the tape being of a uniform thickness substantially equal to that of an individual thread, the union between said threads being sufficiently strong to hold said threads normally in their assembled relationship but being readily breakable to permit the division of said tape into its constituent threads.

5. That improvement in methods of making rubber thread, which consists in assembling a series of sheets of unvulcanized rubber in superposed relationship to form a stack, vulcanizing said assembly, prior to said vulcanizing operation introducing a sufficient quantity of talc or equivalent material between adjacent sheets of said stack to cause the vulcanizing operation to produce a limited but controlled adhesion of the sheets to each other, and subsequently cutting said stack to produce a tape composed of threads cut from the respective sheets and in which the threads will be bonded temporarily to each other by the controlled adhesion produced between the sheets during said vulcanizing operation, said bond being readily breakable to permit the division of said tape into its constituent threads.

6. That improvement in methods of making rubber thread, which consists in assembling a series of sheets of unvulcanized rubber in superposed relationship to form a stack, cutting said assembly to give said stack a circular outline, vulcanizing said assembly while preserving its circular form, revolving said stack edgewise against the edge of a rotating cutter while relatively feeding the cutter and said stack to cause the cutter to cut continuous rubber threads from said respective sheets, at some stage in the process prior to said vulcanizing operation, treating said sheets to cause said vulcanizing operation to produce a limited and controlled adhesion of the sheets to each other, whereby they will be held in their assembled condition during cutting and the cutting operation will produce a tape in which the individual threads will be united temporarily to each other by the adhesive bond previously produced between the sheets.

7. That improvement in processes of manufacturing products in which rubber thread is incorporated, which consists in supplying a series of rubber threads to the process in which they are to be used with the individual threads adhesively but releasably bonded together side by side in the form of a tape, the adhesive union between said threads being sufficiently strong to maintain the integrity of said tape during normal handling but permitting the threads composing the tape to be readily separated from each other, feeding said tape toward the operating point, during said feeding movement breaking the bond between the adjacent threads and thereby dividing said tape into the individual threads of which it is composed, and maintaining a substantially uniform tension on said threads and the adjacent portion of said tape while the threads are being so separated and fed to the operating point.

8. In a machine for fabricating a product in which rubber thread is incorporated, the combination of mechanism for manipulating a series of rubber threads and one or more fibrous threads to produce said product, means for holding a supply of rubber threads with said threads bonded together temporarily to form a tape, means for feeding said tape and advancing the threads composing it to the fabricating point and maintaining said threads stretched and under a substantially uniform tension during said feeding operation, and means for separating the threads composing said tape during said feeding movement without substantially disturbing said tension.

9. The herein described method comprising the steps of assembling a plurality of circular sheets of rubber in superposed relationship, causing said sheets to adhere to each other, supporting said assembly of sheets in a flat condition on a yielding backing, revolving said assembly in its own plane, cutting against the edge of said assembly with a rapidly rotating knife, and during said revolving and cutting operations relatively feeding the knife and the assembly bodily to cause the knife to cut through said assembly and against said backing to produce a continuous tape composed of threads of rubber cut from the individual sheets.

10. That improvement in processes of manufacturing products in which rubber thread is incorporated, which consists in supplying a series of rubber threads to the process in which they are to be used with the individual threads adhesively but releasably bonded together in parallel side-by-side relationship forming a tape of a substantially uniform thickness substantially equal to that of an individual thread, the adhesive union between said threads being sufficiently strong to maintain them in their assembled condition for normal handling but permitting them to be readily separated, feeding said assembly toward the operating point, during said feeding movement breaking the adhesive bonds uniting adjacent threads to each other and thereby dividing said assembly into the individual threads of which it is composed, and continuing the feed of the separated threads to the operating point.

11. That improvement in processes of manufacturing products in which rubber thread is incorporated, which consists in supplying a series of rubber threads to the process in which they are to be used with the individual threads adhesively but releasably bonded together in parallel side-by-side relationship forming a tape in which the threads are of approximately rectangular cross-sectional shape and the tape has a uniform thickness substantially equal to that of an individual tape, the adhesive union between said threads being sufficiently strong to maintain them in their assembled tape-like condition for normal handling but permitting them to be readily separated, feeding said assembly under tension toward the operating point, pulling said threads apart while the assembly is so fed, and continuing the feed of the separated threads to the points at which they are to be utilized.

12. In a machine for fabricating a product in which rubber thread is incorporated, the combination of mechanism for manipulating a series of rubber threads and one or more fibrous threads to produce said product, means for holding a supply of rubber threads with said threads bonded together temporarily to form a tape, means for feeding said tape toward the fabricating point and feeding the threads composing the tape to the fabricating point and maintaining said threads and the adjacent portion of said tape under a substantially uniform tension during said feeding operation, and a comb through which said threads are fed, whereby said comb serves to separate the threads composing said tape during said feeding movement without substantially disturbing said tension.

KENNETH R. SHAW.